(12) United States Patent
Marshall et al.

(10) Patent No.: US 6,693,698 B2
(45) Date of Patent: *Feb. 17, 2004

(54) DISPLAY DEVICE

(75) Inventors: Thomas Marshall, Hartsdale, NY (US); Kevin W. Haberern, Cary, NC (US)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,620

(22) Filed: Jul. 22, 1998

(65) Prior Publication Data

US 2002/0060763 A1 May 23, 2002

(51) Int. Cl.[7] .................... G02F 1/1343; G02F 1/1333
(52) U.S. Cl. .................... 349/148; 349/147; 349/138
(58) Field of Search .................. 349/138, 147, 349/148, 113

(56) References Cited

U.S. PATENT DOCUMENTS 4,761,058 A * 8/1988 Okubo et al. ............... 350/331
5,323,252 A * 6/1994 Yoshida et al. ............. 349/148
5,764,324 A   6/1998 Lu et al. .................... 349/113
5,834,797 A * 11/1998 Yamanaka ................... 257/57

FOREIGN PATENT DOCUMENTS

JP    10054995 A    2/1998    ......... G02F/1/1343

* cited by examiner

Primary Examiner—Toan Ton
Assistant Examiner—Dung Nguyen
(74) Attorney, Agent, or Firm—Ernestine C. Bartlett

(57) ABSTRACT

A display device is provided which includes a first substrate having at least one transparent, first picture electrode of a first material, a second substrate having at least one second picture electrode of a second material which, jointly with the picture electrode on the first substrate and an intermediate opto-electronic material, defines a pixel, and means for supplying electric voltages to the picture electrodes, wherein at least one of the picture electrodes is coated with at least one layer of a passivating material such that any asymmetry in operation of the device is substantially reduced or eliminated.

19 Claims, 2 Drawing Sheets

DISPLAY DEVICE

FIELD OF THE INVENTION

This invention relates to a display device comprising a first substrate having at least one transparent, first picture electrode of a first material, a second substrate having at least one second picture electrode of a second material which, jointly with the picture electrode on the first substrate and an intermediate opto-electronic material, defines a pixel, and means for supplying electric voltages to the picture electrodes.

BACKGROUND OF THE INVENTION

Display devices of this type are generally known and usually comprise a large number of pixels. The first type comprises, for example, LCDs, both of the passive and active type; the second type comprises, for example, plasma-addressed liquid crystal display devices referred to as PALC displays.

Notably when the second picture electrode is reflective, the drive of these display devices appears to be sensitive to the alternating supply of positive and negative voltages across the pixels. This becomes manifest as, for example, flicker. In a picture period, in which a positive voltage is written, the same picture information leads to a different voltage across the pixel than in the subsequent picture period in which a negative voltage is written. At a frame frequency of, for example, 60 Hz, this leads to a flicker frequency of 30 Hz, which is clearly noticeable in the picture. The display devices also often suffer from image retention. In this application, reflecting picture electrodes are also understood to mean partially reflecting, semi-transparent electrodes, as are used in transflective display devices.

SUMMARY OF THE INVENTION

An object of the invention is to provide a display device that is at least partly or entirely free of one or more of said problems.

Another object of the invention is to provide a display device in which the flicker problem is substantially reduced or eliminated.

These and other objects are accomplished, according to a first embodiment of a display device of the invention in which at least one of the picture electrodes is coated with at least one layer of a passivating material such that any asymmetry in operation of the device is substantially reduced or eliminated.

In preferred embodiments of the invention, at least one of the picture electrodes is coated with at least one layer of a dielectric material, and at least one layer of a passivating material such that any asymmetry in operation of the device is decreased.

Most preferably, the reflective LCDs of the invention may utilize a silicon chip as the reflective wall of the cell and a glass sheet as the transmissive wall. The addressing electronics are integrated on the chip, along with the matrix electrodes and switches. Aluminum metalization for the electronics also serves as the reflective electrode of the cell, while the standard indium tin oxide (ITO) serves as the transmissive electrode. A passivating material is provided on the entire silicon chip or a portion thereof with the effect that any asymmetry in operation of the device is substantially reduced or eliminated.

As used in this invention, the term "passivating material" and its derivations means a material effective to modify or otherwise adapt the materials comprising the device to exhibit a reflective response having a degree of asymmetry that is decreased when compared to the asymmetry of the same device in the absence of such material.

This invention is based on the recognition that the "flicker" problem is a result of cell asymmetry. We have observed that the reflective LCD cell or pixel, when operated with a symmetric ac electrical signal, develops in time an asymmetric reflection response. While not intending to be bound by any one theory or hypothesis for the invention since there may be several possible causes for the occurrence of this phenomenon, we have found that the reflection asymmetry arises due to the asymmetry of the materials that make up the cell, i.e. the use of materials that are dissimilar in certain electrical properties or functions which leads to asymmetry of the device in operation. In our work, the reflective LCD cell may be analogized to a leaky capacitor. A typical construction includes one electrode comprising a reflective picture electrode, for example formed of aluminum, and a second electrode comprising a transparent picture electrode, for example formed of ITO. A dielectric material, for example, a polyimide dielectric, is present in intimate contact with each electrode, and a liquid crystal material connects the two layers. One of the central premises of this invention is that the Schottky barrier formed between the aluminum electrode and polyimide dielectric is fundamentally different from the Schottky barrier formed between the ITO electrode and polyimide dielectric. This is thought to be caused by the different material properties of the two electrodes which are believed to result in the leakage in ac operation being asymmetrical. It is believed that this in turn leads to an excess charge and thereby to an asymmetric electric field in response to a symmetric voltage. It is also believed that the local electric field affects or governs the LC response rather than the voltage on the remote electrodes, and that the invention reduces the asymmetry by reducing the dissimilarity between the materials, for example the aluminum and ITO, by applying a layer of a material effective to passivate the aluminum or ITO or both, preferably a layer of a noble metal such as Au, Pt, Ir, Rh, or Pd, most preferably Au, on the aluminum, or on the ITO, or both. Due to the stepped profile that is normally present in the silicon chip, the noble metal layer is discontinuous, and thus does not short out the aluminum metalization.

Regardless of the actual mechanism or hypothesis by which the invention works, it has been found that the application of such a passivating layer or passivating material is effective to substantially decrease or eliminate the "flicker" problem in the display devices that contain such passivated reflective LCDs that result from the invention.

This invention also relates to a method for producing such passivated reflective LCDs which comprises the steps of providing a passivating material, such as a noble metal, preferably Au, on a surface of the device, preferably adjacent the metalization or on or adjacent a portion of the device that comprises the metalization.

The method may be accomplished in different ways, for example, by coating the transparent picture electrode or the reflecting picture electrode, or both, with at least a layer comprising at least a thin layer of the same or different passivating material.

Also, when using a (organic) dielectric material, which is preferably chosen from the group of polyimides or polyamide acids comprising or not comprising fluorine, the reflecting picture electrode and the transparent picture electrode may be coated with a layer comprising at least a layer of the same (organic) dielectric material, the material on one of the two picture electrodes having been subjected to, for example, a UV treatment when these electrodes are coated with a layer comprising at least a layer of the same (organic) dielectric material.

If desired, the layer of dielectric material may function as an orientation layer.

Specifically, in its most preferred embodiments, in the display devices of the invention, the passivating material will be a thin layer of gold, platinum, iridium, rhodium, or palladium provided on a silicon wafer by a method which comprises coating the entire silicon wafer as received from a silicon fabrication process, with a thin layer of passivating material. The starting silicon chip for example, will comprise a surface on which reflecting aluminum electrodes may be provided, while switching elements (transistors) may be provided in the subjacent silicon.

Also in especially preferred embodiments, a reflective LCD is made using one ITO electrode, and using the aluminum metalization on the silicon chip as the other LCD electrode, the full addressing electronics being implemented in the silicon chip, the aluminum serving as the reflector as well as the metalization. In such embodiment, the passivating material is preferably gold (Au) provided between the aluminum on the silicon chip and the rest of the LCD cell.

Various amounts of the passivating material may be used, with preferred amounts ranging from about 1 nm to about 5 nm. It is important that the passivating material be present in amounts that result in thin films, so that when applied, it does not cause a short circuit among the many separate pixels of the display. We have found that when Au is the passivating material present in amounts that give rise to thicknesses from about 1 nm to 5 nm, the thickness of Au present cannot form a continuous film bridging otherwise separate Al metal regions, due to the thickness of the Al, and the resulting surface texture. Thus, it is possible to take advantage of the step coverage to avoid shorting out the circuit.

BRIEF DESCRIPTION OF THE DRAWINGS

The figures are diagrammatic and not to scale. Corresponding components generally have the same reference numerals.

The invention will be better understood with reference to the details of specific embodiments which follow:

DETAILED DESCRIPTION OF THE PREFERRED EMBODIMENTS

Figure 1:
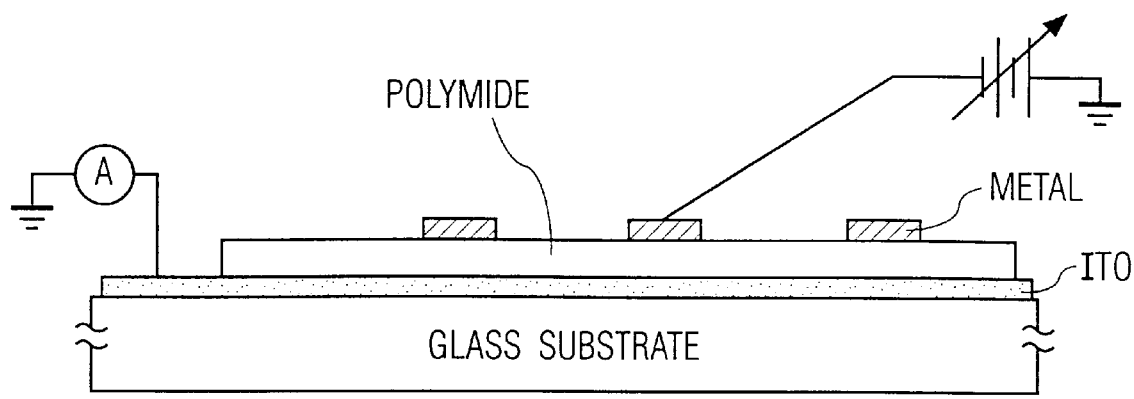
FIG. 1 is a cross-section of a part of a test display device according to the invention.

With reference to FIG. 1, there is illustrated a test structure, which comprises only some of the parts of a LC cell, and which was devised to test the effectiveness of the use of a passivating material in a display device. A glass substrate with an ITO layer was spin-coated with polyimide. A small region of the ITO layer was left uncoated to serve as the back electrode contact. This structure was then placed on a shadow mask, and circular dots of metal were evaporated onto the polyimide surface. Various metals were tried including Au, Al, Ti, and combinations thereof. All other parameters of the test structures were identical. FIG. 1 is also a schematic cross-section, including a schematic of the electrical connections for I–V measurements. The test structures were measured electrically. dc I–V measurements were made for applied voltages in the range of −0.5 to +0.5 V. This arbitrary value was chosen as representative of the field across the polyimide under typical reflective-LCD operation. The LC requires about 5–6 V to operate. To measure the asymmetry of the I–V, for any one sample, the values of the currents at plus and minus 0.25 V could vary by a factor of 5–10 among different dots, but the ratios of plus to minus for a set of dots typically varied by less than about 25%. The figure of merit ratio is denoted here as R and is defined as:

$$R=|I(-0.25V)|/I(+0.25V)$$

,i.e. the absolute value of the current at −0.25V, divided by the current at +0.25V.

Values of R that are close to unity are construed as favorable since symmetry is desired, while values that differ from unity are increasingly unfavorable with reference to reflective LCD operation.

Values of R were obtained for Al, Ti, and AU monolayers, Au with an overcoat of Al, and also for Hg, using drops of the liquid metal instead of then evaporated dots described above. The results were as tabulated below.

TABLE

| METAL | R VALUE |
|---|---|
| Al | 6.5 |
| Ti | 3.1 |
| Hg | 1.7 |
| Au | 0.9 |
| Au/Al* | 0.8 |

(*Au in contact with polyimide)

Al showed the largest values of R, while Au showed values quite close to unity. Indeed, as long as a thin coat of Au was in contact with the polyamide, a thick overcoat of Al had no significant effect on the data. The tentative conclusions of these tests are: (1) the electrode material asymmetry, via the Schottky barrier difference, is at least partially responsible for the flicker problem, and (2) Au is a much better choice than Al as a passivating material, at least from a consideration of the electrical characteristics alone, although aluminum is more advantageous in terms of reflectivity.

To test the feasibility of these assumptions, a thin, about 30 Å, film of Au was blanket deposited, i.e. with no masking, onto the Al metalization of a reflective LCD test structure, and an operating test cell was fabricated from this Au-coated component. The results were the flicker of the operating cell was significantly reduced and there was no shorting of individual pixels from the blanket deposition of a metal conductor.

Figure 2:
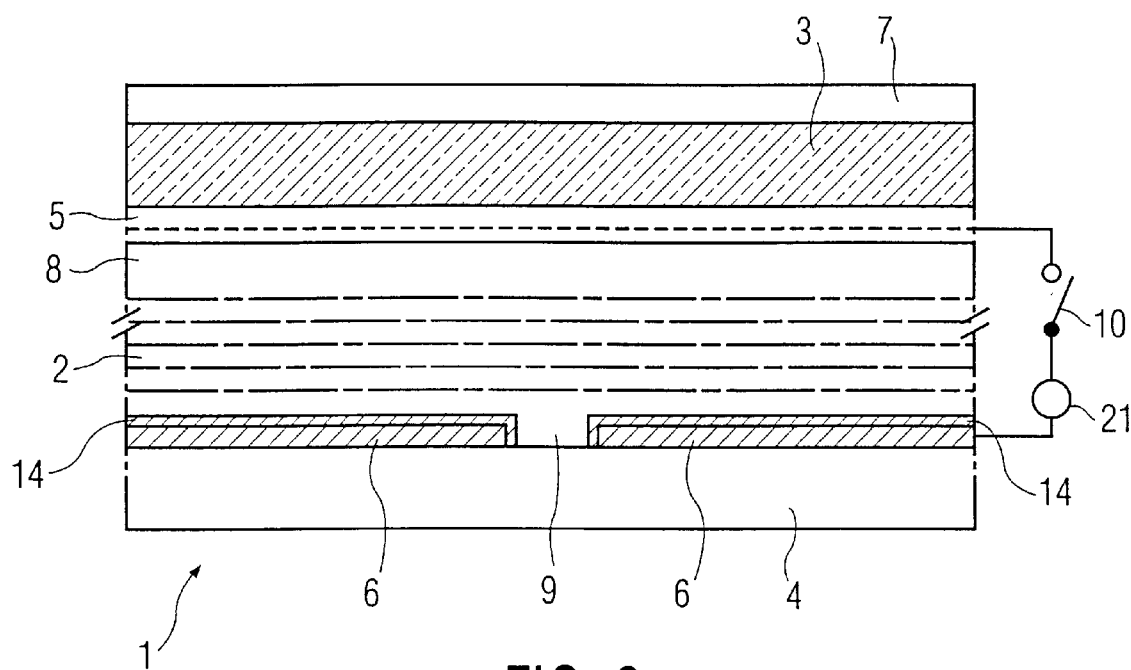
FIG. 2 is a cross-section of a part of a display device according to the invention.

FIG. 2 is a cross-section of a part of a display device comprising an electro-optical display cell, in this example a liquid crystal cell 1 with a twisted nematic liquid crystal material 2 present between a first transparent substrate 3 of, for example glass comprising an electrode 5, and a second substrate 4. The electrode 5 is made of a light-transmissive material, for example ITO. The second substrate 4 comprises electrodes 6 of a reflecting or diffuse reflecting material such as, for example, aluminum. The second substrate 4 is opaque in this example and may consist of various materials, for example, a silicon wafer in which switching elements are integrated.

Different electro-optical effects may be used, particularly liquid crystal effects such as (S)TN, guest-host, PDLC, ferro-electrics, VAN, reflective OCB, HAN, etc. Dependent on the effect used, the device comprises a polarizer 7. In this example, the device also comprises one or more orientation layers 8,9 which orient the liquid crystal material on the inner walls of the substrates, such that the cell has a twist angle of approximately 90° in this example. The display device comprises drive means for supplying drive voltages to the electrodes 5,6. These drive means are diagrammatically indicated by means of the switch 10 and a voltage source 21. In this example, either or both the ITO layer 5 and the aluminum electrode 6 is coated with a thin passivating layer of Au 14. One or more of the orienting layer 8,9 may also be coated with a layer of a dielectric material or the dielectric material may be substituted for the orienting layer.

Figure 3:
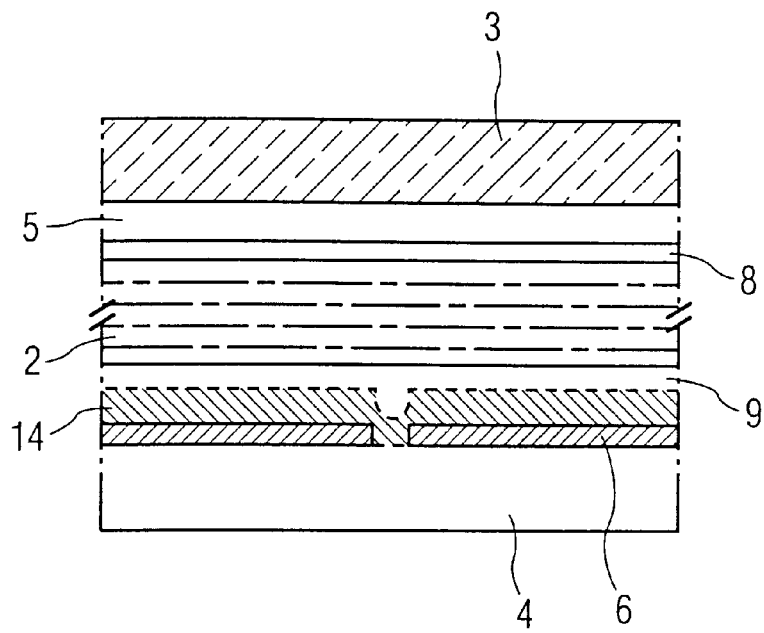
FIGS. 3 and 4 are variants of FIG. 2.

In the device of FIG. 3, a silicon wafer is used for the substrate 4, in which switching elements energizing the switching electrodes 6 are contained. The switching electrodes are mutually separated, while the entire wafer is coated with a thin passivating layer 14 of gold which is only several monolayers thick. By coating the surface with gold, the reflectivity is hardly influenced. Besides, the layer is so thin that no or hardly any lateral conductance occurs; the voltage across an electrode 6 is thus entirely determined by a subjacent switching element. In this embodiment, a symmetric reflective display cell is obtained which may be used notably in projection applications.

The flicker may be measured in various ways. For example, it may be measured optically by applying a square-wave voltage with an identical positive and negative amplitude across a pixel, by measuring the flicker (for example, by means of an exposure meter) and by giving such an offset that the flicker is substantially invisible. Another method is purely electrical but only suitable for active drive. In this method, the voltage variation during non-selection across a pixel is fixed by means of sample-and-hold circuits. Voltage differences which occur during a negative and a subsequent positive field or frame are mutually compared whereafter, if necessary, an offset voltage is introduced to eliminate the voltage differences. By minimizing these differences, in this case by providing the passivating layer 14, the internal DC voltage (and hence the flicker, but also image retention and said transient phenomena) are thus reduced considerably.

The transparent conductor 5 may be alternately manufactured from a different material than ITO such as $SnO/In_2O_3$ or polyaniline.

Figure 4:
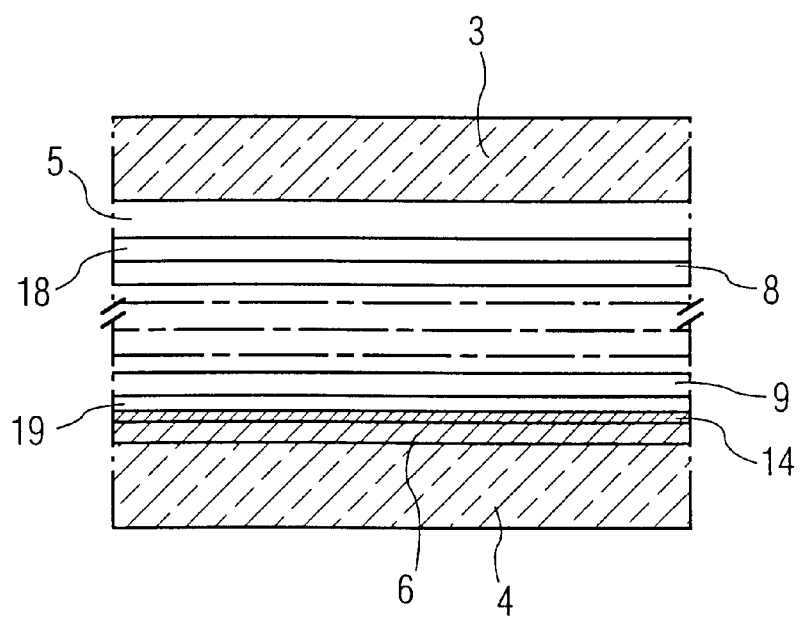

FIG. 4 is a cross-section of a part of a display device comprising an electro-optical display cell in which a liquid crystal cell 1 with a twisted nematic liquid crystal material 2 which is present between a first transparent substrate 3 of, for example glass comprising an electrode 5, and a second substrate 4 comprising an electrode 6. The electrodes are coated on at least one substrate with layers 18, 19 of an organic dielectric material having a small conductance and an internal dipole such as, for example hydrocarbons, fluorinated hydrocarbons, etc. If desired, the layers 18 and 19 may be coated with layers 8,9 of orienting material. Suitable materials include a polyamide acid material, a precursor polyimide, a material comprising fluorine, a polyamide acid material comprising fluorine, polyethyleneimine, etc. A layer of passivating material 14 is superimposed between the aluminum electrode 6 and the layer 19. An example of a preferred dielectric material is a polyimide of pyromeeletic anhydride and 2,2-bis[4-(4-aminophenoxy)phenyl]-hexafluoropropane.

The invention is of course not limited to the examples shown. For example, in FIG. 4, the layers 18, 19 may be made of a material which is suitable as an orientation material for the liquid crystal material. The layers 8, 9 can then be dispensed with.

The invention may be embodied in other specific forms without departing from the spirit and scope or essential characteristics thereof, the present disclosed examples being only preferred embodiments thereof.

We claim:

1. A display device comprising a first substrate having at least one transparent, picture electrode of a first material, a second substrate comprising at least one electrode of a second material which, jointly with the picture electrode on the first substrate and an intermediate opto-electronic material, defines a pixel, and means for supplying electric voltages to the lectrodes, wherein at least one of the electrodes is coated with at least one layer of a noble metal as a passivating material such that any asymetry in operation of the device is substantially reduced or eliminated.

2. A display device as claimed in claim 1, wherein the electrode of the second material is reflective.

3. A display device as claimed in claim 1, wherein at least one of the electrodes is coated with at least a layer of conducting material and at least a layer of a dielectric material.

4. A display device as claimed in claim 1, wherein said metal is Au.

5. A display device comprising a first substrate having at least one picture electrode of a first material, a second substrate comprising at least one electrode of a second material which, jointly with the picture electrode on the first substrate and an intermediate opto-electronic material, defines a pixel, and means for supplying electric voltages to the electrodes, wherein said second substrate comprises at least one electrodes coated with at least one layer of conducting material, and the picture electrodes on the first substrate is coated with at least one layer of a noble metal as a passivating material such that any asymmetry in operation of the device is substantially reduced or eliminated.

6. A display device as claimed in claim 5, wherein the electrode of the second material is reflective.

7. A display device as claimed in claim 5, wherein the picture electrode of a first material and the electrode of a second material are coated with a layer comprising at least a layer of the same dielectric material.

8. A display device comprising a first substrate having at least one transparent, picture electrode of a first material, a second substrate having at least one electrode of a second material which, jointly with the picture electrode on the first substrate and an intermediate opto-electronic material, defines a pixel, and means for supplying electric voltages to the electrodes, wherein at least one of the electrodes is coated with at least one layer of a dielectric material, and said electrode on the second substrate is coated with at least one layer of a noble metal as a passivating material such that any asymmetry in operation of the device is substantially reduced or eliminated.

9. A display device as claimed in claim 8, wherein the second electrode of the second material is reflective.

10. A display device as claimed in claim 8, wherein the dielectric material is chosen from the group consisting of polyimides and polyamide acids.

11. A display device as claimed in claim 8, wherein the dielectric material comprises fluorine-containing polyimides or polyamide acids.

12. A display device comprising a first substrate having at least one transparent, picture electrode of a first material, a second substrate comprising at least one second electrode of a second material which, jointly with the picture electrode on the first substrate and an intermediate opto-electronic material, defines a pixel, and means for supplying electric voltages to the electrodes, at least one of the substrates being a silicon wafer wherein at least the picture electrode portion or the second electrode portion is coated with a passivating layer of a noble metal whereby any asymmetry in operation of the device is substantially reduced or eliminated when compared to devices that do not have said passivating layer.

13. A display device as claimed in claim 12, wherein the noble metal is Au.

14. A display device as claimed in claim 13, wherein the thickness of the passivating layer is not more than several monolayers.

15. A display device as claimed in claim 14, wherein the entire silicon wafer is coated with said passivating layer, said silicon wafer comprising switching elements and switching electrodes which are mutually separated and contained in subjacent silicon areas of said wafer.

16. A method for the production of a display device having a first substrate having at least one transparent, picture electrode of a first material, a second substrate comprising at least one second electrode of a second material which, jointly with the picture electrode on the first substrate and an intermediate opto-electronic material, defines a pixel, and means for supplying electric voltages to the electrodes, wherein at least one of the electrodes is coated with at least one layer of a passivating material such that any asymmetry in operation of the device is substantially reduced or eliminated, said method comprising the steps of forming electrodes on first and second substrates, at least one of said substrates being comprised of at least a portion of a silicon wafer which forms at least one picture electrode of a display device, and coating at least said portion of said silicon wafer with a passivating material, at least one of the electrodes of said silicon wafer portion being coated with at least one layer of said passivating material such that any asymmetry in operation of the device is substantially reduced or eliminated.

17. A method as claimed in claim 16, wherein said silicon wafer comprises switching elements and switching electrodes which are mutually separated and contained in subjacent silicon areas of said wafer.

18. A display device comprising a first substrate having at least one transparent, picture electrode of a first material, a second substrate comprising at least one second electrode of a second material which, jointly with the picture electrode on the first substrate and an intermediate opto-electronic material, defines a pixel, and means for supplying electric voltages to the electrodes, wherein at least one of the electrodes is coated with at least one layer of a passivating material such that any asymmetry in operation of the device is substantially reduced or eliminated, the thickness of the passivating layer being within the range of about 1 nm to about 5 nm.

19. A display device comprising a first substrate having at least one transparent, picture electrode of a first material, a second substrate comprising at least one second electrode of a second material which, jointly with the picture electrode on the first substrate and an intermediate opto-electronic material, defines a pixel, and means for supplying electric voltages to the electrodes, wherein at least one of the substrates is a silicon wafer coated with a passivating layer of Au, wherein said passivating layer is effective to substantially reduce or eliminate any asymmetry in operation of the device, and wherein the thickness of the passivating layer is within the range of 1 nm to 5 nm.

* * * * *